(12) United States Patent
Cheng et al.

(10) Patent No.: US 11,237,313 B2
(45) Date of Patent: Feb. 1, 2022

(54) REFLECTIVE ELECTRONIC DISPLAY DEVICE

(71) Applicant: NATIONAL CENTRAL UNIVERSITY, Taoyuan (TW)

(72) Inventors: Ko-Ting Cheng, Chiayi (TW); Cheng-Kai Liu, Hsinchu County (TW)

(73) Assignee: NATIONAL CENTRAL UNIVERSITY, Taoyuan (TW)

( * ) Notice: Subject to any disclaimer, the term of this patent is extended or adjusted under 35 U.S.C. 154(b) by 226 days.

(21) Appl. No.: 16/732,470

(22) Filed: Jan. 2, 2020

(65) Prior Publication Data
US 2021/0208324 A1 Jul. 8, 2021

(51) Int. Cl.
*G02B 5/30* (2006.01)
*G02B 27/28* (2006.01)
*G02F 1/1335* (2006.01)

(52) U.S. Cl.
CPC ......... *G02B 5/3058* (2013.01); *G02B 27/281* (2013.01); *G02F 1/133536* (2013.01); *G02F 1/133541* (2021.01); *G02F 1/133548* (2021.01)

(58) Field of Classification Search
CPC ............ G02F 1/0128; G02F 1/133536; G02F 1/133548; G02F 1/133541; G02F 1/133528; G02F 1/133531; G02F 1/133601; G02F 1/13362; G02B 27/281; G02B 5/3058; G02B 5/3025; G02B 5/30
See application file for complete search history.

(56) References Cited

U.S. PATENT DOCUMENTS

2005/0225824 A1* 10/2005 Bell ..................... G02B 3/0062
359/237

* cited by examiner

*Primary Examiner* — Stephone B Allen
*Assistant Examiner* — Adam W Booher
(74) *Attorney, Agent, or Firm* — Guice Patents PLLC (57) ABSTRACT

A reflective electronic display device being pixels or sub-pixels includes: a main substrate; an electromagnetic micro-electromechanical module installed on a side of the main substrate; a shaft coupled to the electromagnetic micro-electromechanical module and the main substrate; a reflector stacked on the other side of the main substrate; a first polarizer stacked on the reflector and configured to be opposite to the main substrate, and the first polarizer defining a first penetration axis; a second polarizer installed on a side of the first polarizer a side, and the second polarizer defining a second penetration axis; an electromagnetic micro-electromechanical module driving the main substrate to drive the reflector, so as to link and rotate the first polarizer and define a bright mode, a dark mode, and a grayscale mode.

8 Claims, 13 Drawing Sheets

REFLECTIVE ELECTRONIC DISPLAY DEVICE

FIELD OF INVENTION

The present invention relates to the field of reflective electronic display devices, in particular to a multi-grayscale reflective electronic display device.

BACKGROUND OF INVENTION

Description of the Related Art

In recent years, low power consuming display devices such as e-Papers and e-Readers have been used extensively, and the major advantage of the display devices of this sort resides on that it only consumes power when switching display information, and ambient light is mainly used as the light source of these e-Papers and e-Reader, and thus it does not require any built-in backlight source and omit the main power consumption of the backlight source, so as to extend the using time of battery. The color display of the aforementioned electronic products adopts the so-called "Cholesteric liquid crystal display, ChLCD) (Reflective liquid crystal display, S.-T. Wu, D.-K. Yang, Wiley 2001) as the e-Reader, and its advantages reside on that it does not continue consuming power while displaying color information, and the light source of this reader is mainly ambient light, so that the consumption of battery power can be reduced and saved significantly, but its disadvantage resides on that the arrangement of the pitch structure (such as the pitch length) of the cholesteric liquid crystal changes with temperature, so that the wavelength of the reflected light changes with temperature, and the color displayed by the display device also changes with temperature. In addition, the cholesteric liquid crystal is mainly driven by voltage, so that the required voltage is higher than that of the common liquid crystal display, and the response speed is slower. Please refer to the book "Reflective liquid crystal display, S.-T. Wu, D.-K. Yang, Wiley 2001"; and refer to "Recent Pat. Nanotechnol. 2010; 4(3):137-49" for other display technologies of the e-Reader such as the electrophoretic display device, and U.S. Pat. No. 7,847,999 B2, 2010 entitled "INTERFEROMETRIC MODULATOR" for an e-Reader adopting the interferometric principle.

At present, the technology adopted by common e-Readers is the E-ink technology as disclosed in U.S. Pat. No. 2008/0043317 A1, 2008 entitled "E-INK DISPLAY PANEL" for the principle of such technology. However, this patented technology has the drawbacks including a black screen or image retention of short duration occurred during the update of display screens. In addition, R.O.C. Pat. No. I605292 entitled "Electric-field-driven display device" also disclosed a method for reducing image retention. In summation, it is a main subject for related manufacturers to overcome the aforementioned drawbacks of the prior art in order to provide better screens and reading experience to users.

SUMMARY OF THE INVENTION

In view of the aforementioned drawbacks of the prior art, it is a primary objective of the present invention to provide a multi-grayscale display for e-Papers, E-books, or even smart phones and overcome the drawbacks of the prior art including the occurrence of black screen or image retention while switching screens.

To achieve the aforementioned and other objectives, the present invention provides a reflective electronic display device being pixels or sub-pixels, comprising: a main substrate; an electromagnetic micro-electromechanical module, installed on a side of the main substrate, and having a shaft coupled to the electromagnetic micro-electromechanical module and the main substrate; a reflector, stacked onto the other side of the main substrate; a first polarizer, stacked on the reflector and configured to be opposite to the main substrate, and the first polarizer further defining a first penetration axis; and a second polarizer, installed on a side of the first polarizer and spaced from the first polarizer; wherein, the second polarizer further defines a second penetration axis; and the electromagnetic micro-electromechanical module drives the main substrate to drive the reflector, so as to link and rotate the first polarizer, and when the first penetration axis is parallel to the second penetration axis, the light is transmitted by the second polarizer and projected towards the first polarizer, and after the light passes through the first polarizer, the light is reflected by the reflector and then passed through the first polarizer again and projected towards the second polarizer to define a bright mode; and the electromagnetic micro-electromechanical module drives the main substrate to drive the reflector, so as to link and rotate the first polarizer, and when the first penetration axis is perpendicular to the second penetration axis, the light after being transmitted by the second polarizer is unable to reach the reflector, since the light absorbed by the first polarizer is defined as a dark mode; and the electromagnetic micro-electromechanical module drives the main substrate to drive the reflector, so as to link and rotate the first polarizer, and when an included angle is formed between the first penetration axis and the second penetration axis, the included angle is controlled in order to control a grayscale display to define a grayscale mode.

This disclosure with the aforementioned technical characteristics has the following advantages: The pixels or sub-pixels are operated by the electromagnetic micro-electromechanical module and the main substrate is driven to drive the reflector, so as to link and rotate the first polarizer, so that the first penetration axis of the first polarizer and the second penetration axis of the second polarizer are parallel to each other (to define the bright mode), perpendicular to each other (to define the dark mode) or form an included angle (to define the grayscale mode). Further, the plurality of pixels/sub-pixels are combined to display various screen information, and after the display information is updated, the display information can be displayed without continuing the consumption of electric power, so as to achieve a power-saving effect. In addition, the reflective electronic display device of this disclosure does not have the problem of black screen or image retention while switching screens.

DESCRIPTION OF THE PREFERRED EMBODIMENTS

To make it easier for our examiner to understand the objective of the invention, its structure, innovative features, and performance, we use a preferred embodiment together with the attached drawings for the detailed description of the invention. It is noteworthy that the description did not take the reflection produced by different interfaces, and the contents described in the embodiment is provided for the purpose of illustrating the present invention, but not intended for limiting the scope of the invention.

With reference to FIGS. 1 to 8 for a reflective electronic display device in accordance with this disclosure, the reflective electronic display device comprises: a main substrate 1; an electromagnetic micro-electromechanical module 2, installed on a side of the main substrate 1, and having a shaft (not shown in the figure) coupled to the electromagnetic micro-electromechanical module 2 and the main substrate 1; a reflector 3, stacked on the other side of the main substrate 1, and the electromagnetic micro-electromechanical module 2 driving the main substrate 1 by the shaft to drive a reflector 3 coupled thereto to perform a horizontal rotation; a first polarizer 4, stacked on the reflector 3 and configured to be opposite to the main substrate 1, and the first polarizer 4 further defining a first penetration axis 41; and a second polarizer 5, installed on a side of the first polarizer 4 and vertically spaced from each other, and the second polarizer 5 further defining a second penetration axis 51; wherein the electromagnetic micro-electromechanical module 2 drives the main substrate 1 to drive the reflector 3, so as to link and rotate the first polarizer 4, and when the first penetration axis 41 is parallel to the second penetration axis 51, a light is transmitted by the second polarizer 5 and projected towards the first polarizer 4, and after the light is completely passed through the first polarizer 4, the light is reflected by the reflector 3. Since the polarization direction remains unchanged, therefore the light can be passed through the first polarizer again and transmitted towards the second polarizer 5 to define a bright mode. The design of the distance between the first polarizer 4 and the second polarizer 5 is intended to prevent the production of friction between the first polarizer 4 and the second polarizer 5 while the first polarizer 4 is rotating. The electromagnetic micro-electromechanical module 2 drives the main substrate 1 to drive the reflector 3, so as to link and rotate the first polarizer 4, and when the first penetration axis 41 is perpendicular to the second penetration axis 51, the light is transmitted by the second polarizer 5 and cannot reach the reflector 3 since the light is absorbed by the first polarizer 4 to define a dark mode. In addition, the electromagnetic micro-electromechanical module 2 drives the main substrate 1 to drive the reflector 3, so as to link and rotate the first polarizer 4, and when an included angle 6 is formed between the first penetration axis 41 and the second penetration axis 51, and the included angle 6 is controlled to adjust the grayscale to define a grayscale mode. When the display device of this disclosure is switching screens, black screen or image retention will not occur. In addition, the display device does not continue consuming electric power while displaying the screen.

Figure 1:
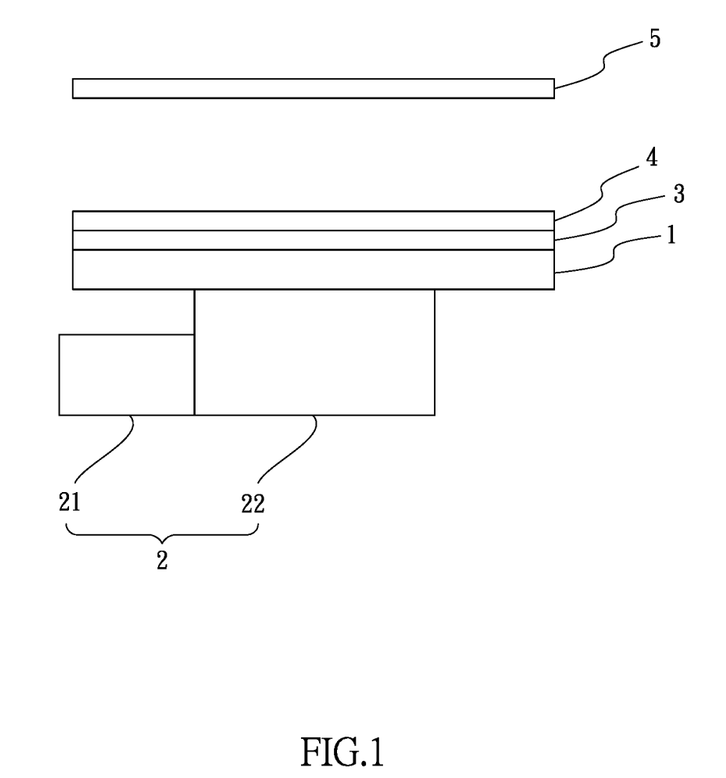
FIG. 1 is a schematic view of a reflective electronic device in accordance with this disclosure.
Figure 2:
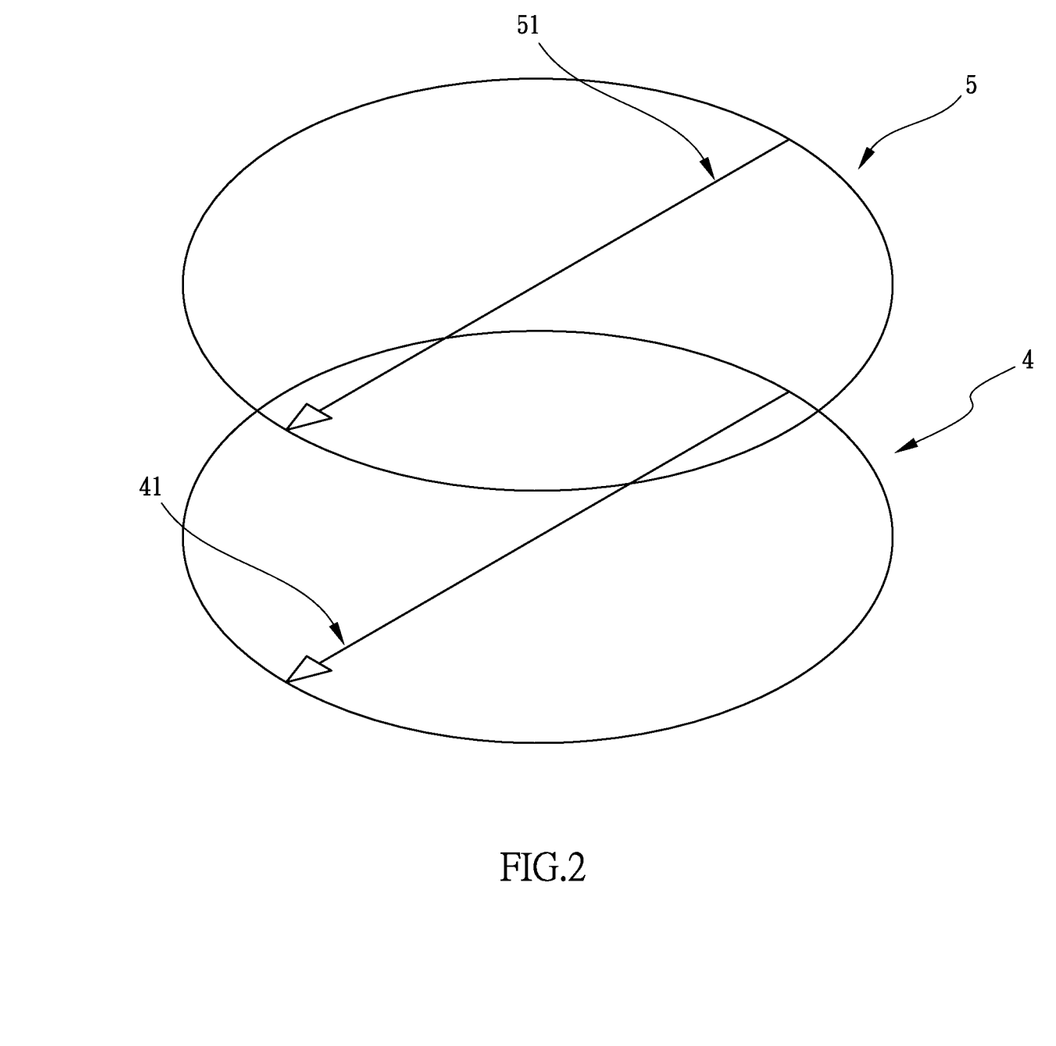
FIG. 2 is a schematic view of a first polarizer and a second polarizer respectively having a first penetration axis and a second penetration axis parallel to each other in a bright mode in accordance with this disclosure.
Figure 3:
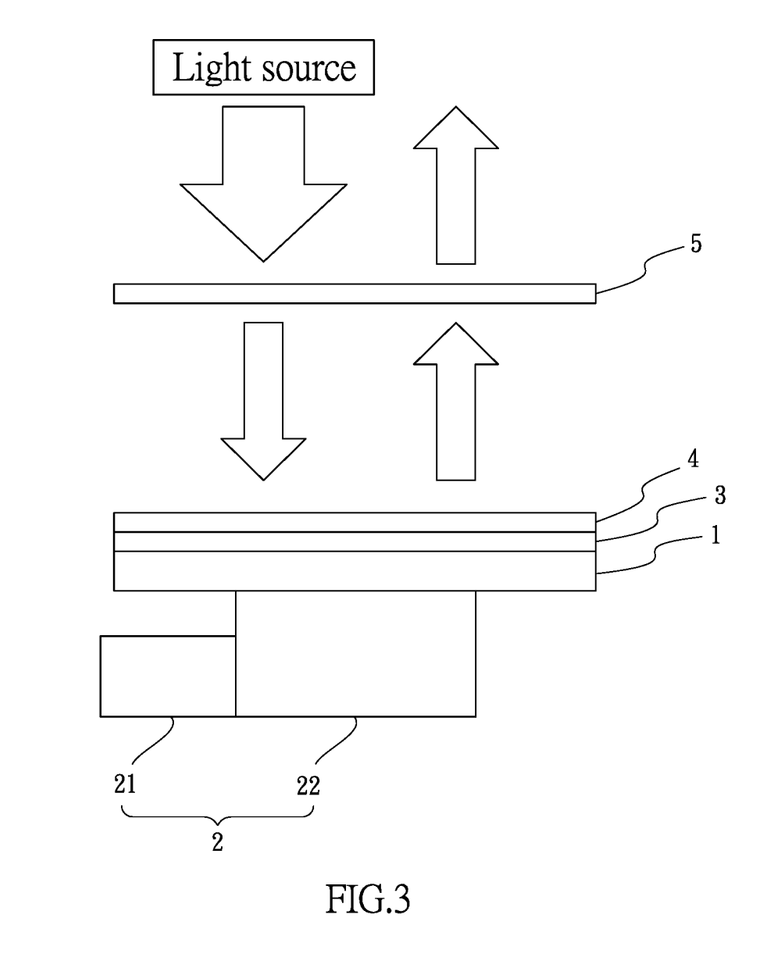
FIG. 3 is a schematic view showing the path of a light transmitted by the second polarizer and passed through a reflected by the first polarizer and then reflected by the reflector and further passed through the first polarized and reflected by the reflector again in the bright mode in accordance with this disclosure.
Figure 4:
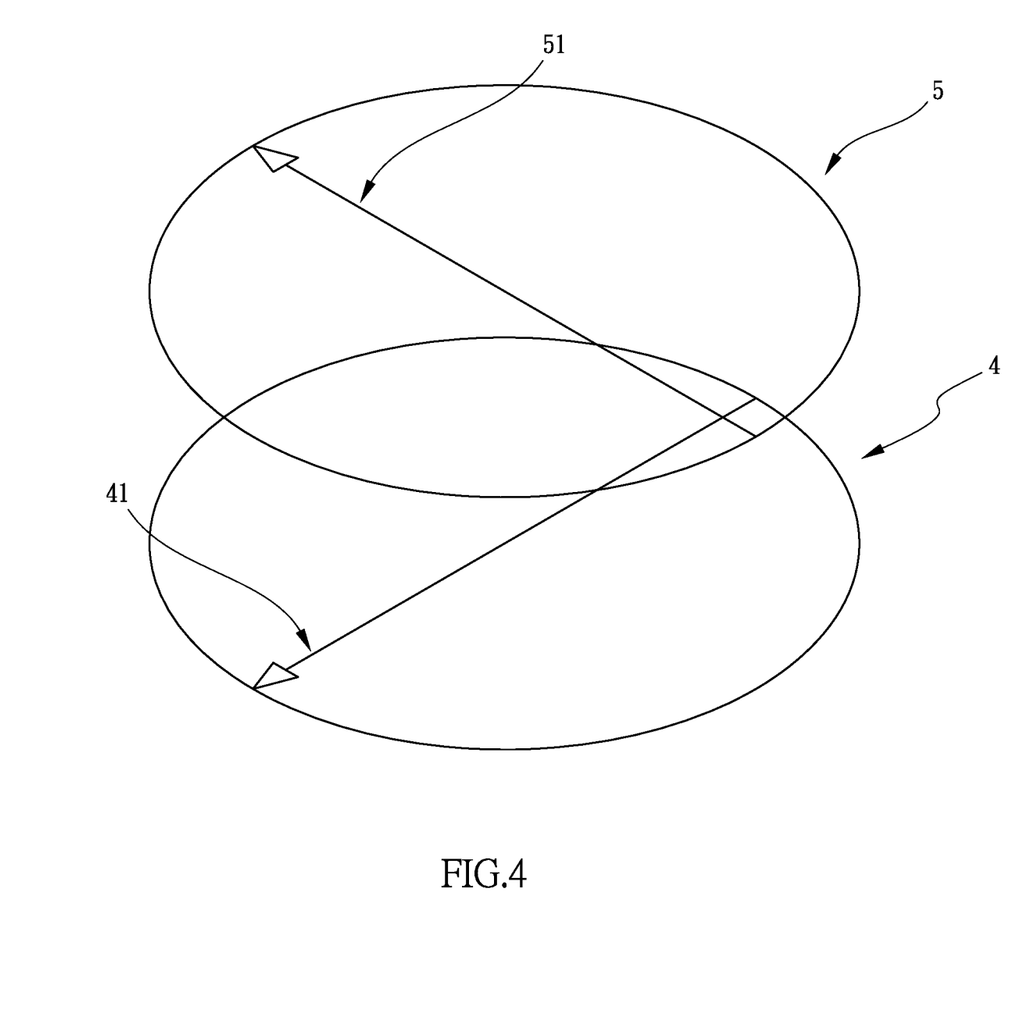
FIG. 4 is a schematic view of the first polarizer and the second polarizer respectively having the first penetration axis and the second penetration axis perpendicular to each other in a dark mode in accordance with this disclosure.
Figure 5:
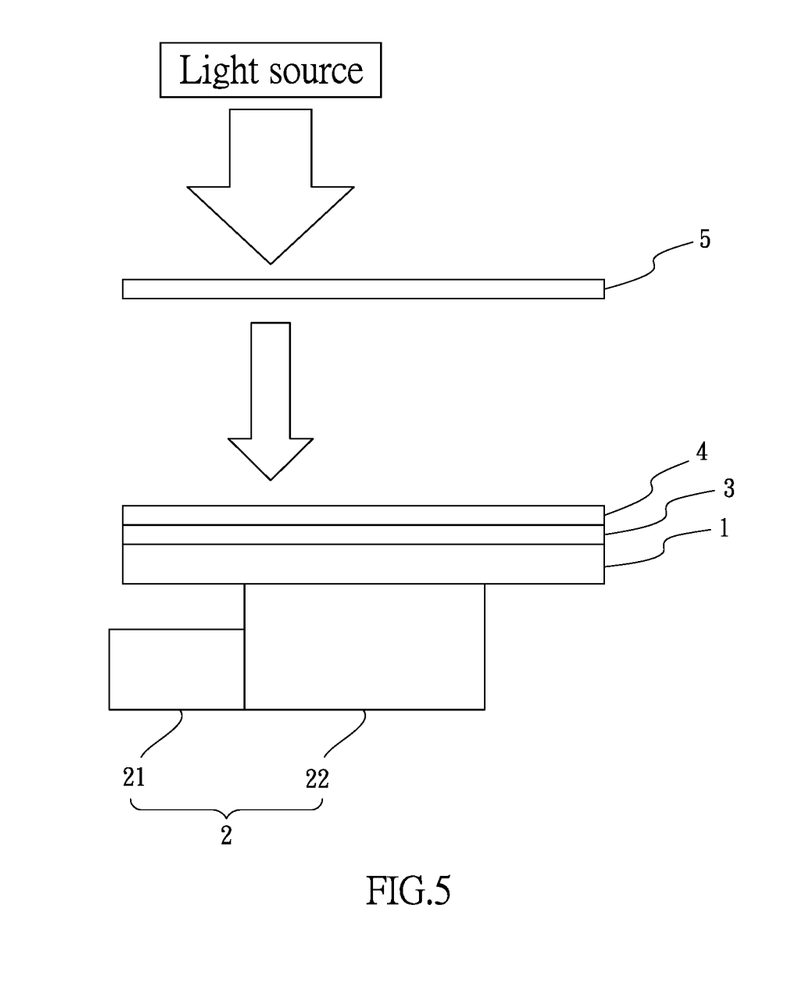
FIG. 5 is a schematic view showing the path of a light transmitted by the second polarizer and absorbed by the first polarizer in the dark mode in accordance with this disclosure.
Figure 6:
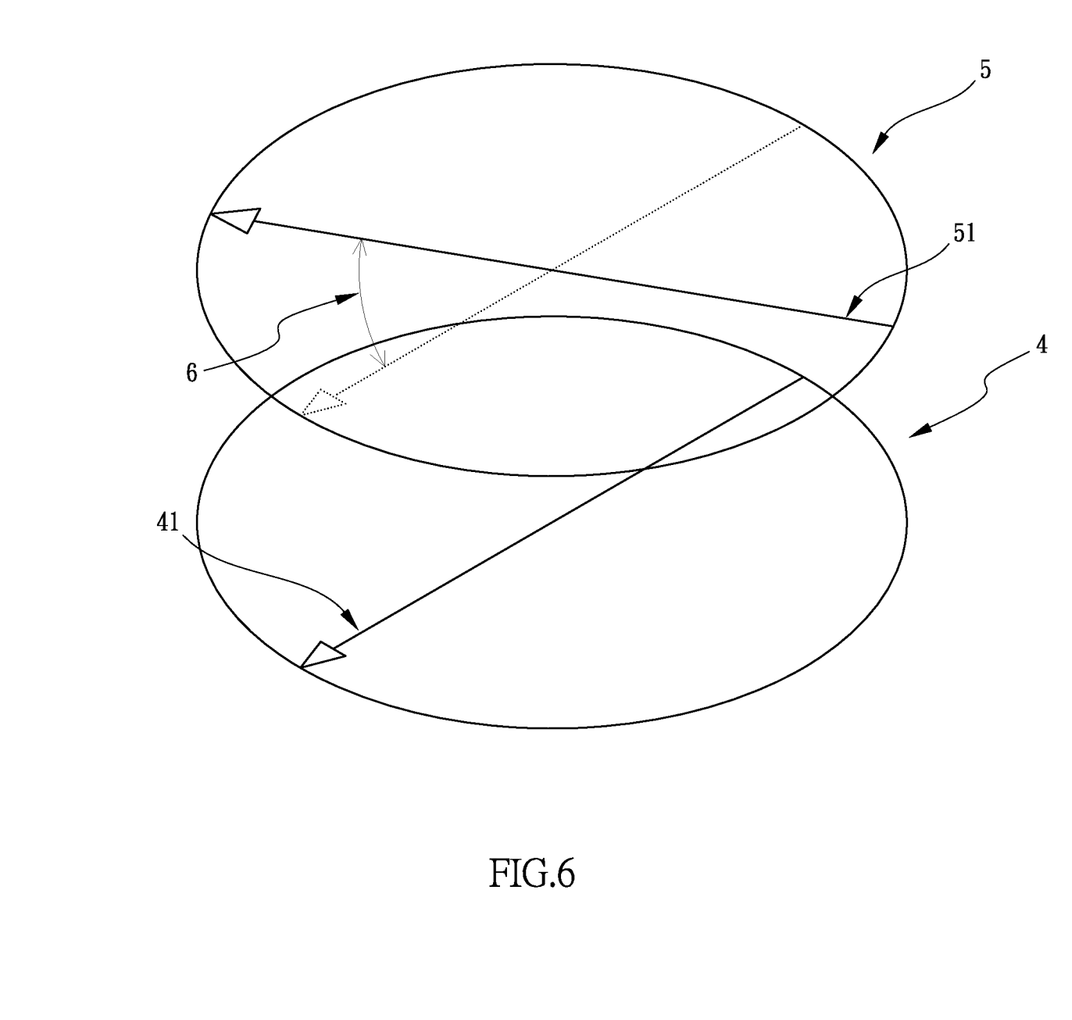
FIG. 6 is a schematic view showing an included angle formed between the first penetration axis of the first polarizer and the second penetration axis of the second polarizer in a grayscale mode in accordance with this disclosure.
Figure 7:
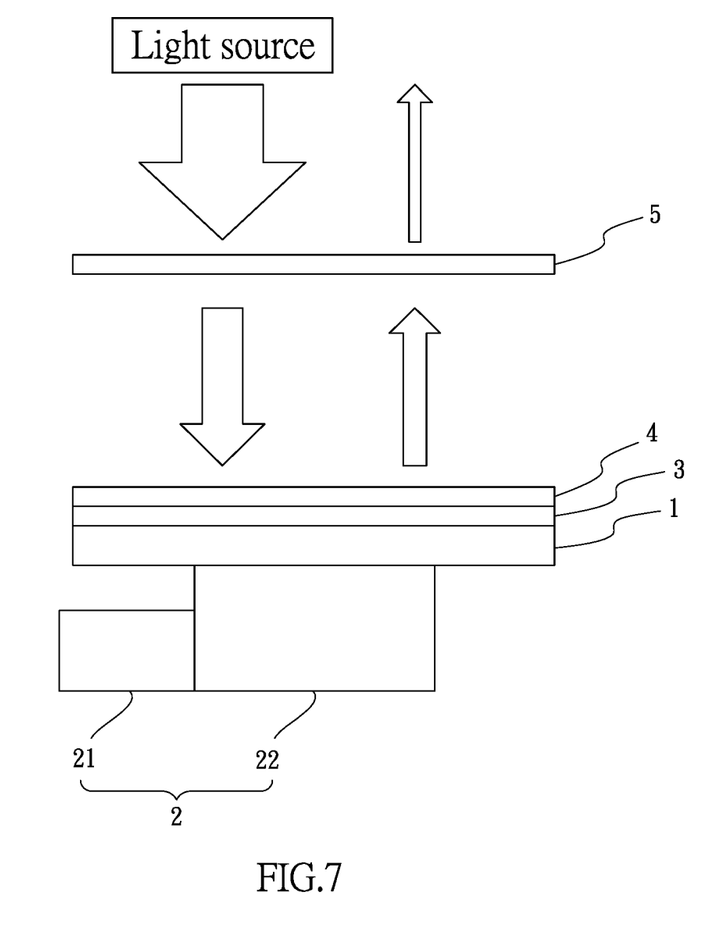
FIG. 7 is a schematic view showing the path of a light transmitted by the second polarizer, and passed through the first polarizer, and reflected by the reflector, and then passed through the first polarizer and the second polarizer again in the grayscale mode in accordance with this disclosure.
Figure 8:
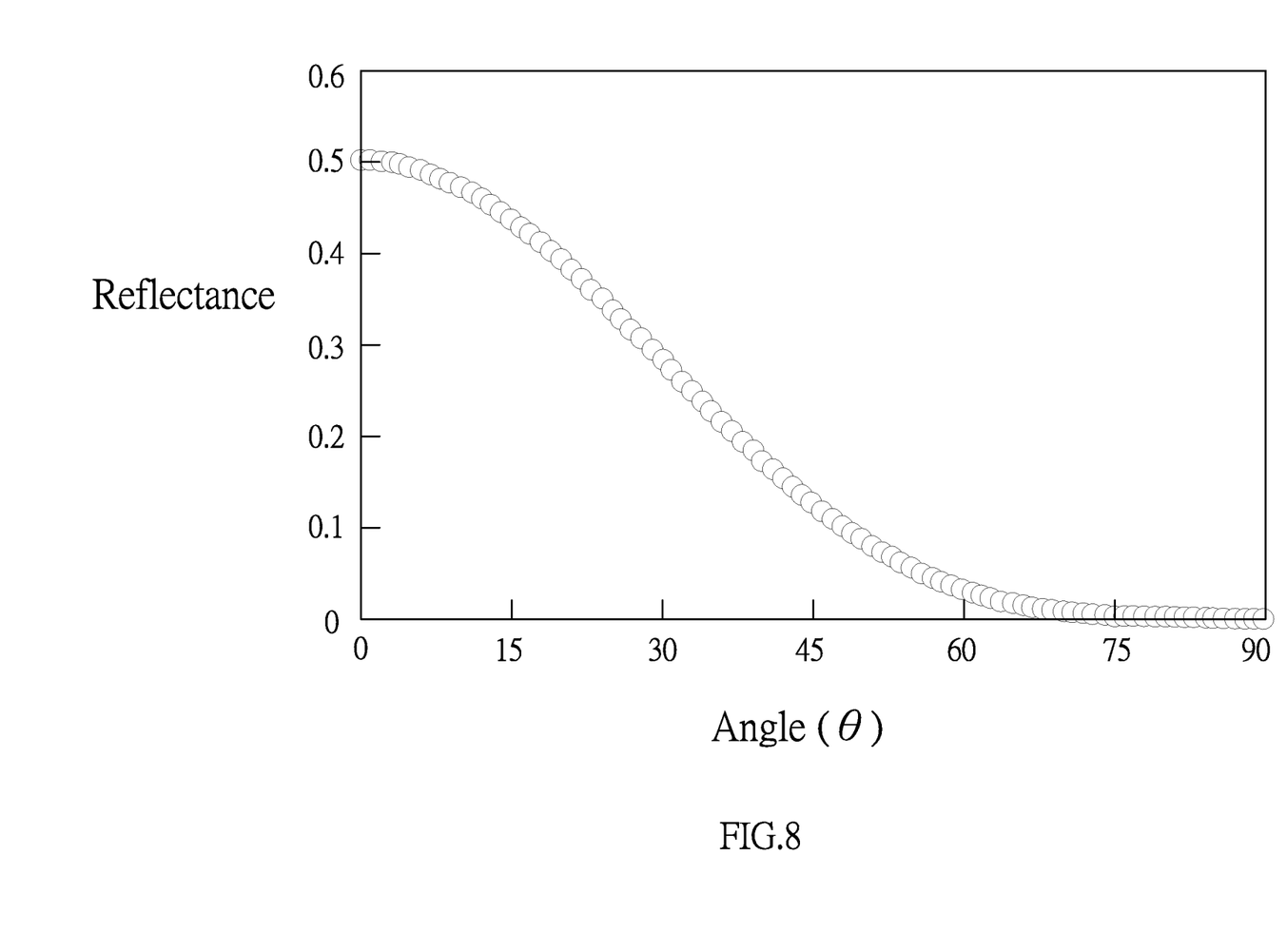
FIG. 8 is a graph of the reflectance of a reflected light intensity versus an included angle formed between the first penetration axis and the second penetration axis in accordance with this disclosure.
Figure 9:
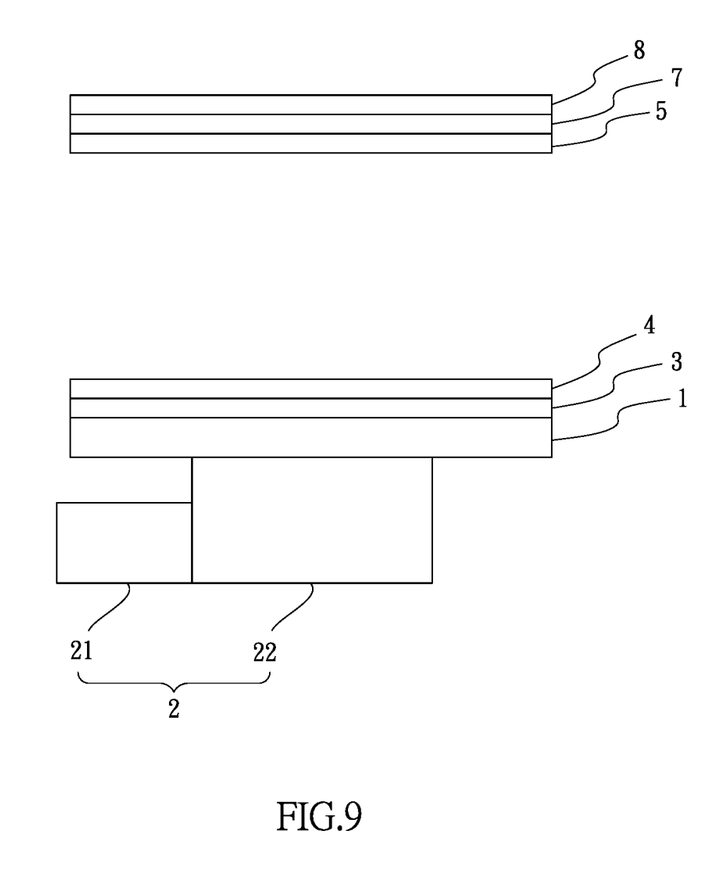
FIG. 9 is a schematic block diagram of a protector and an anti-reflection film installed on a second polarizer of this disclosure.

According to the description above, this disclosure can be divided mainly into three parts, respectively: the bright mode, dark mode and grayscale mode for discussion and description. In FIGS. 1 to 3, when it is necessary to switch to the bright mode, the reflector 3 and the first polarizer are controlled and rotated by the operation of the electromagnetic micro-electromechanical module 2, such that the first penetration axis 41 of the first polarizer 4 and the second penetration axis 51 of the second polarizer 5 are parallel to each other, and a light (referring to an unpolarized light) is incident perpendicularly from a side of the second polarizer 5, and the intensity of the incident light is T. When the light passes through the second polarizer 5, approximately half (50%) of the intensity of the light is absorbed, and the remained intensity of the light is approximately T/2, and such light will be incident on the first polarizer 4 having the first penetration axis 41 parallel to the second penetration axis 51, and then passed through the first polarizer 4. After the light has reached to the reflector 3 at the bottom, the light is reflected, and the polarization direction of the light remains unchanged, so that after the light passes through the reflector 3, the light is passed through the first polarizer 4 and transmitted towards the second polarizer 5 to the outside. Now, the intensity of the light is still maintained to a level (which is T/2) when it originally passes through the second polarizer 5. As a result, the display can have a constant brightness. Since ambient light is used, it will not consume too much electric power. In FIGS. 4 and 5, when it is necessary to switch to the dark mode, the light (referring to an unpolarized light) is incident perpendicularly from a side of the second polarizer 5, and the intensity of the incident light is T. When the light passes through the second polarizer 5, approximately half (50%) of the intensity of the light is absorbed, and the remained intensity of the light is approximately T/2, and such light will be incident on the first polarizer 4. Now, the operation of the electromagnetic micro-electromechanical module 2 drives the main substrate 1 to link and rotate the reflector 3 and the first polarizer 4, so that the first penetration axis 41 is perpendicular to the second penetration axis 51, and the incident light of the second polarizer 5 is projected towards the first polarizer 4 and then passed through and totally absorbed by the first polarizer 4, and no light will be projected to or reflected by the reflector 3 disposed on a side of the first polarizer 4. As a result, there will be no light projected out from the second polarizer 5, and the light intensity will be 0, and the screen will be dark (without any brightness). With reference to FIGS. 6, 7 and 8 for another mode of this disclosure, there is a grayscale mode in addition to the bright mode and the dark mode. When the electromagnetic micro-electromechanical module 2 drives the operation of the main substrate 1 to link and rotate the reflector 3 and the second polarizer 5, so that an included angle 6 is formed between the first penetration axis 41 and the second penetration axis 51 (In the formation of the included angle 6, the first axis 41 is projected onto the second polarizer 5, so that an angular position of the included angle is formed between the first penetration axis 41 and the second penetration axis 51). Assumed that a light (referring to an unpolarized light) is incident perpendicularly on a side of the second polarizer 5, and the intensity of the incident light is T. After the light passes through the second polarizer 5, approximately half (50%) of the intensity of the light is absorbed by the second polarizer 5, and the remained intensity of the light is approximately T/2. Assumed that the included angle between the first penetration axis 41 and the second penetration axis 51 is θ, the Malus' law shows that the remained intensity of the light passing through the first polarizer 4 is equal to T $cos_2 θ/2$ (Please refer to the following book "E. Hecht, Optics (Addison Wesley, 2002)"; and the light passing through the first polarizer 4 towards the reflector 3 and then and reflected by the reflector 3 is passed to the first polarizer 4 again. Since the polarization direction of the reflected light remains unchanged, the light can be passed through the first polarizer 4 completely without having any change of light intensity. The light is transmitted out from the first polarizer 4 and passed to the second polarizer 5. Since there is an included angle 6 (θ) between the first penetration axis 41 and the second penetration axis 51, the Malus' Law shows that the light intensity of the light penetrating through the second polarizer 5 is T $cos_4 θ/2$. Therefore, the electromagnetic micro-electromechanical module 2 can be used to control the change of grayscales by controlling the rotation of the reflector 3 and the first polarizer 4 and adjusting the included angle 6. FIG. 8 shows a graph of the included angle 6 versus the reflectance, wherein X-axis represents the angle (which is the included angle 6 (θ)), Y-axis represent the reflectance of light. This graph shows that when the included angle between the first penetration axis 41 and the second penetration axis 51 is 0, the light intensity is 0.5. The included angle between the first penetration axis 41 and the second penetration axis 51 becomes increasingly larger as the reflectance decreases gradually to 0. The smaller the angle, the larger the reflectance. The larger the angle, the smaller the reflectance. The angle may be changed or adjusted to achieve a multi-grayscale display.

Based on the major technical characteristics of this disclosure, the remaining technical characteristics of this disclosure are described further below. Firstly, the electromagnetic micro-electromechanical module 2 comprises a drive transistor 21 and a micro-motor 22, and the drive transistor 21 is electrically coupled to the micro-motor 22 and provided for controlling the forward and backward rotations of the micro-motor 22, and the micro-motor 22 drives the main substrate 1 by the linkage of a shaft (not shown in the figure), so as to drive and rotate the reflector 3. The included angle 6 between the first penetration axis 41 and the second penetration axis 51 may be adjusted to switch among the bright mode, dark mode and grayscale mode as shown in FIG. 1.

To achieve a multi-grayscale display, all polarizers (including the first polarizer 4 and the second polarizer 5) are linear polarizers capable of absorbing a light with a wavelength range covering all visible lights, and the wavelength range of a visible light is mainly from 380 to 780 nm, and the reflector 3 is also a reflector capable of reflecting all visible lights.

Figure 10:
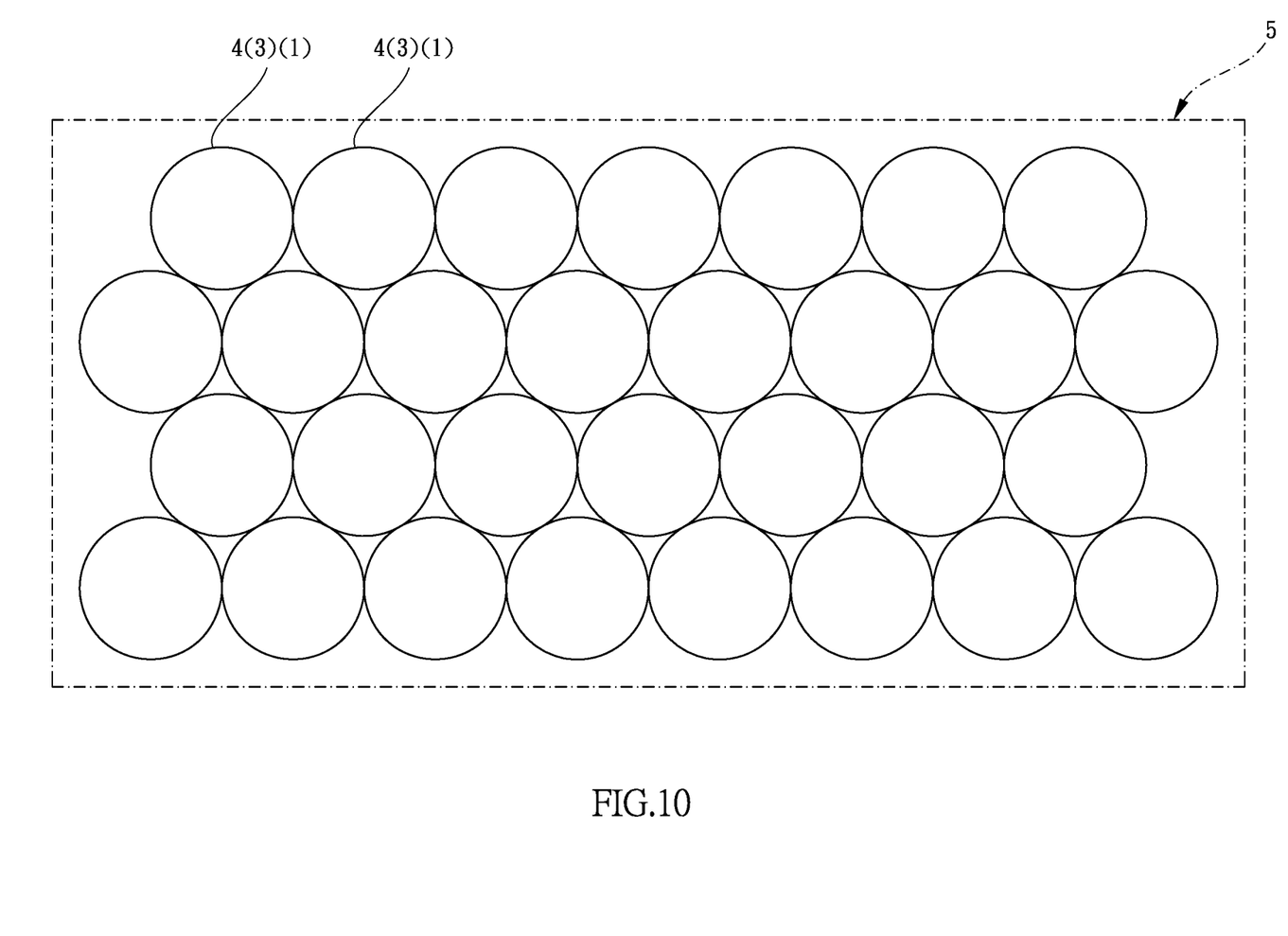
FIG. 10 is a schematic view of a plurality of circular display devices combined with each other in accordance with this disclosure.
Figure 11:
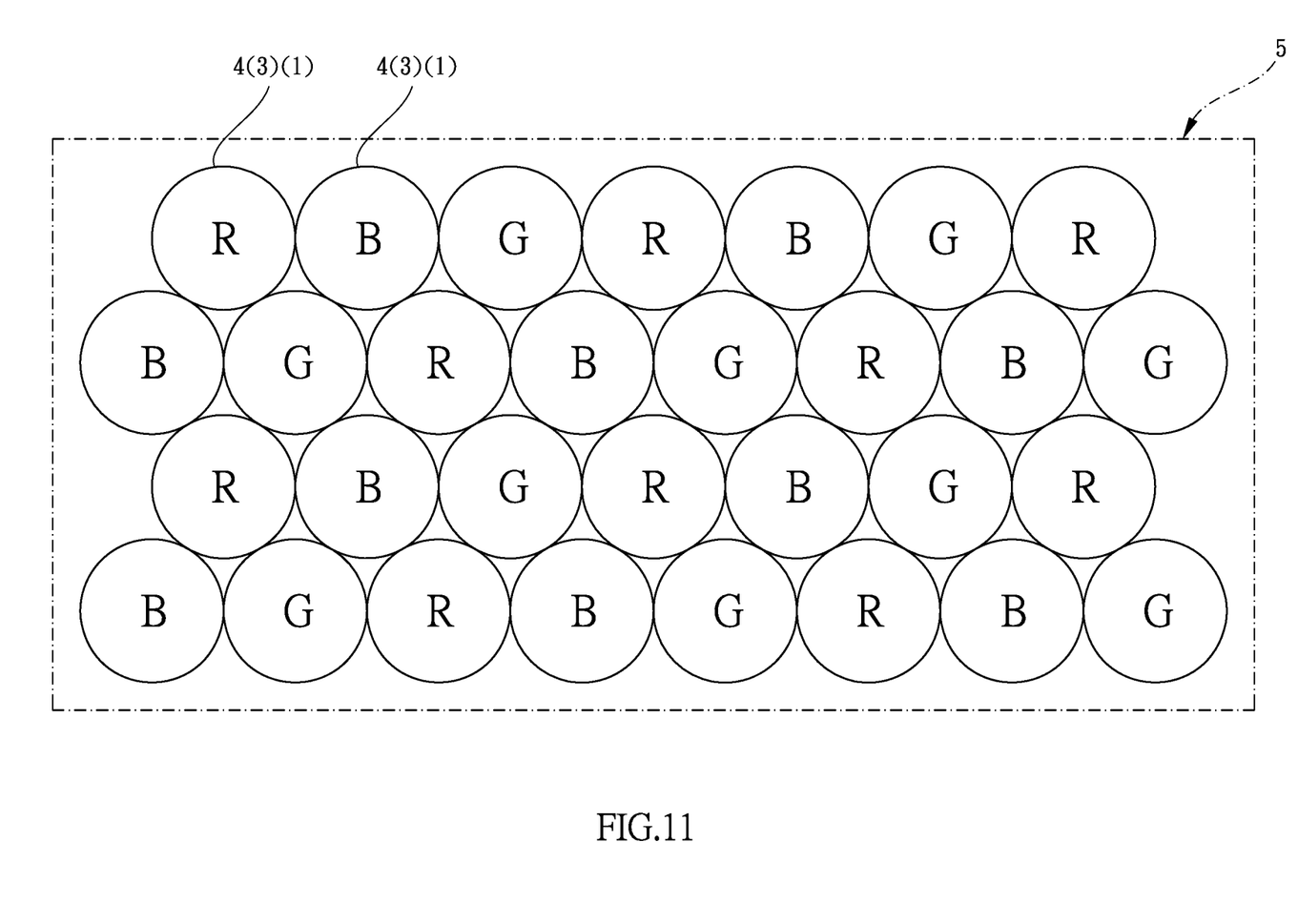
FIG. 11 is a schematic view of adding a color filter to the display device as depicted in FIG. 10.
Figure 12:
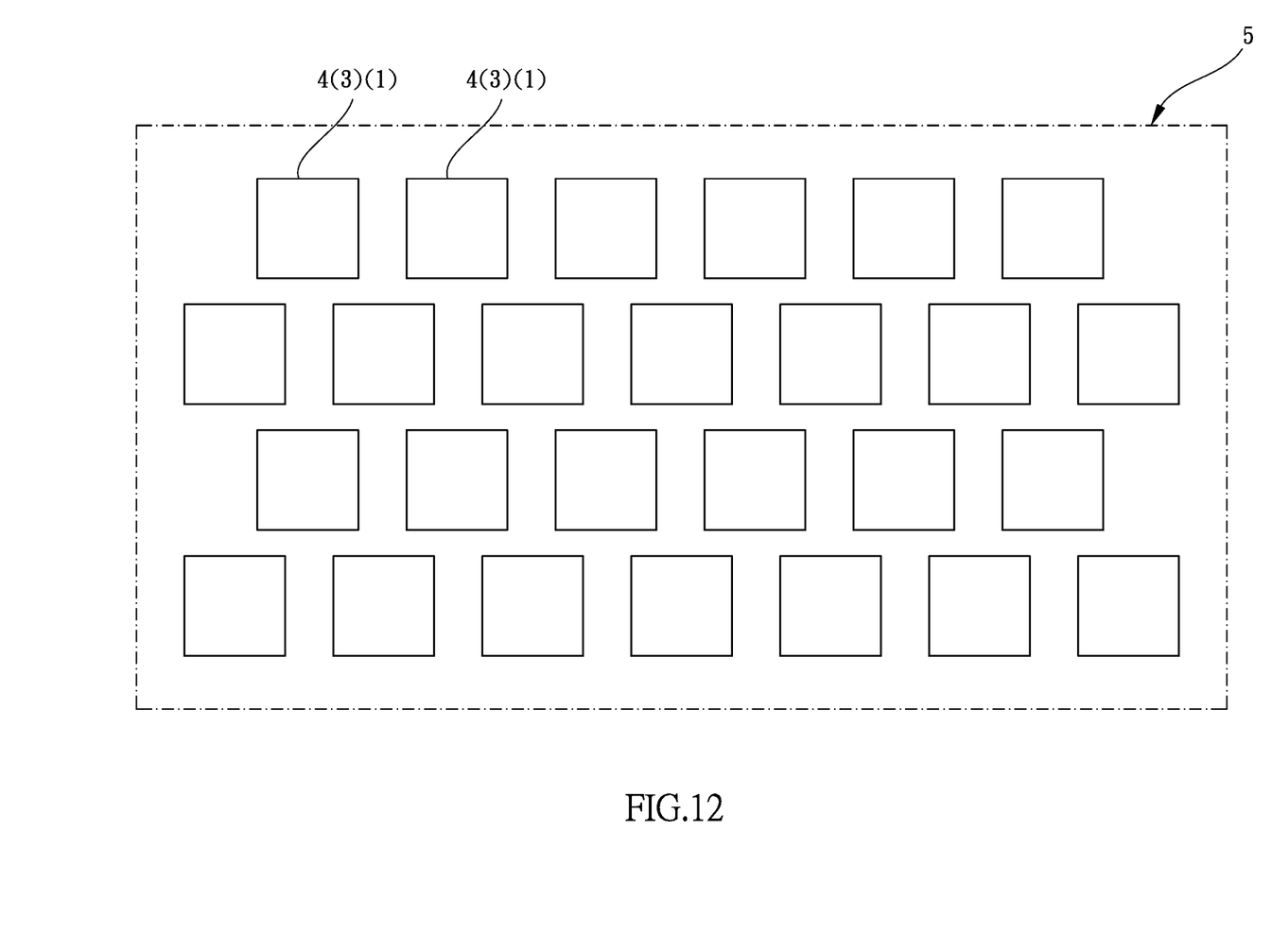
FIG. 12 is a schematic view of a plurality of square display devices combined with each other in accordance with this disclosure.
Figure 13:
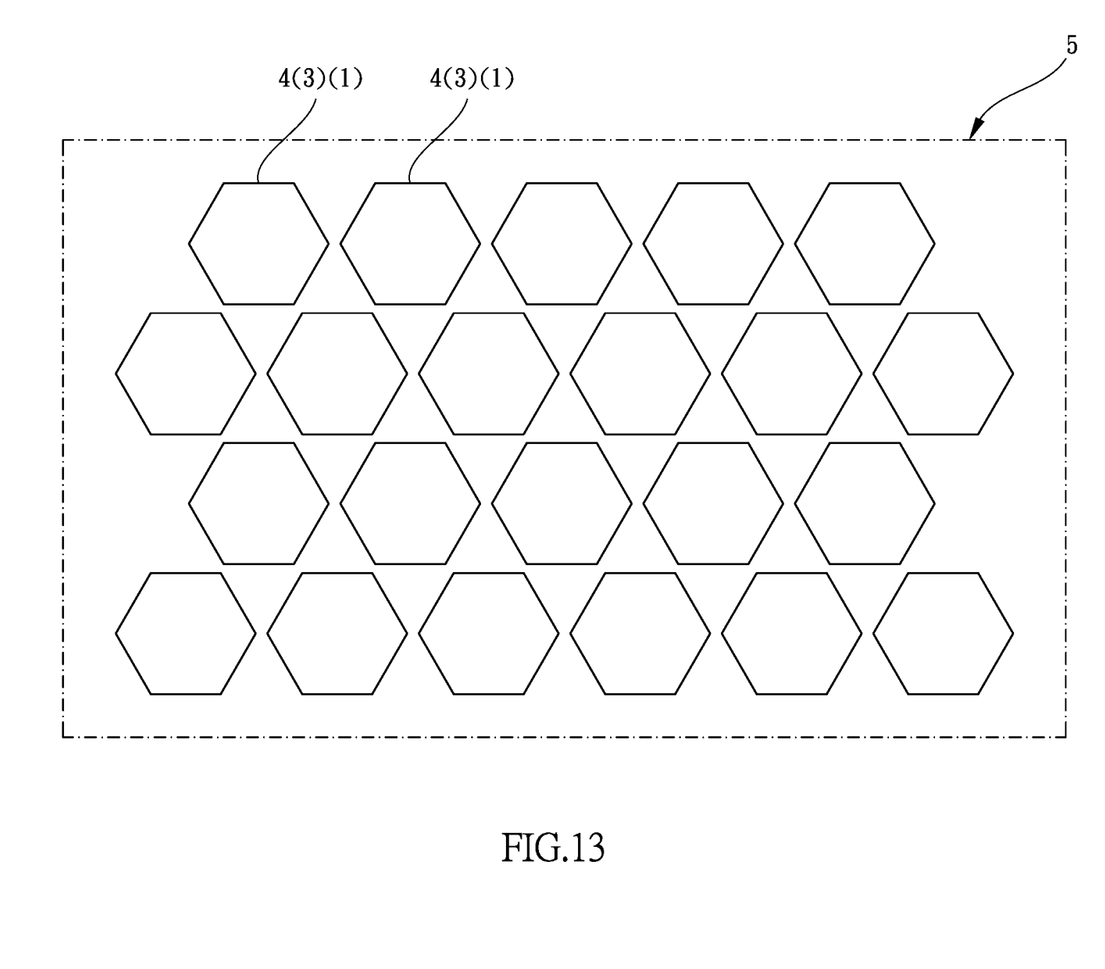
FIG. 13 is a schematic view of a plurality of hexagonal display devices combined with each other in accordance with this disclosure.

To protect the second polarizer 5 from being affected by outside factors, a protector 7 is plated on the top of the second polarizer 5, and an anti-reflection film 8 is plated on the top of the protector 7, and such arrangement can reduce the reflection caused by different interfaces, thereby improving the intensity of the incident light. In addition, the aforementioned technical characteristics of this disclosure can be applied to the screen of an e-Paper, E-book, or foldable mobile phone. In FIGS. 10 and 11, the e-Paper is used as an example for illustrating this disclosure. Assumed that the paper size of e-Paper is A4, this disclosure is for circular pixels/circular sub-pixels in a display screen of the size A4, and thus a plurality of circular pixels/circular sub-pixels of this disclosure are arranged to form a screen with the size of the e-Paper, and such arrangement has been disclosed in the journal (APSIPA Trans. Signal Inf. Process. 1, 1-10 (2012); DOI: 10.1017/AT SIP.2012.3), wherein each circular pixel/circular sub-pixel has its independent micro-motor 22 and is controlled by each independent drive transistor 21, and each independent drive transistor 21 is controlled by one host computer. In other words, if the e-Paper has a black and white display as shown in FIG. 10, the main substrate 1 of each circular pixel and the rotation of the reflector 3 and the first polarizer 4 can be controlled and adjusted by each micro-motor 22 through the control of the host computer, so that each circular pixel can be reflected with a specific brightness to allow the whole piece of e-Paper to have a display of various screens. If the e-Paper has a color display, each circular pixel for showing the black and white is treated as a circular sub-pixel, and the top of each independent circular sub-pixel (second polarizer 5) may be stuck with a filter having the color (red (R), green (G) or blue (B)) as shown in FIG. 11). Now, every three circular sub-pixels constitute a pixel, and these three circular sub-pixels are circular sub-pixels stuck with the red, green and blue filters respectively. Now, the arrangement is a RGB delta arrangement as disclosed in the journal (APSIPA Trans. Signal Inf. Process. 1, 1-10 (2012); DOI: 10.1017/ATSIP.2012.3). If each circular sub-pixel can display 16 grayscales, then 4096 colors can be displayed in the color display mode. Since this disclosure adopts the method of rotating the first polarizer 4 to set the bright mode, dark mode, and grayscale mode, therefore the appropriate shape of the main substrate 1 is circular, and the shapes of the reflector 3 and the first polarizer 4 are the same as that of the main substrate 1 (which is circular), and the diameters of the main substrate 1, the first polarizer 4, and the reflector 3 are the same, and these three components are aligned concentrically with respect to one another. In summation, the drive transistor 21 is provided for controlling the micro-motor 22 to perform forward and backward rotations and control and rotate the main substrate 1, the reflector 3 and the first polarizer 4 of each independent circular pixel/circular sub-pixel. By changing and adjusting the angle between the first penetration axis 41 and the second penetration axis 51, users can switch between the bright mode, dark mode and grayscale mode. In a pixel/sub-pixel arrangement for displaying a specific screen as shown in FIG. 10 or FIG. 11, when it is necessary to switch to the next screen, the micro-motor 22 of the electromagnetic micro-electromechanical module 2 in each circular pixel/circular sub-pixel can rotate the first penetration axis 41 of the first polarizer 4 of each circular pixel/circular sub-pixel to a specific angle as disclosed in the journal "Electromagnetic Micromotors—Design, Fabrication and Applications, Micromachines 2014; 5:929-942", so that the deficiencies of the prior art including the black screen or image retention of the e-Reader adopting the E-INK technology can be overcome to provide a better reading experience for users. In addition, the display method of the reflective electronic display device of this disclosure is not easily affected by temperature, and the speed of updating screens depends on the rotation speed of the micro-motor 22 in the electromagnetic micro-electromechanical module 2. In addition, both of the first polarizer 4 and the reflector 3 are substituted by a single piece of wire grid reflective polarizer. Please refer to the following two patents: "Dual Mode Reflective/Transmissive Liquid Crystal Display Apparatus. U.S. Pat. No. 5,986,730, Nov. 16, 1999" and "Broadband Wire Grid Polarizer for the Visible Spectrum," U.S. Pat. No. 6,122,103, Sep. 19, 2000" for the wire grid reflective polarizer. In this disclosure, the grayscale is determined by the included angle between the first penetration axis 41 and the second penetration axis 51 (as shown in FIG. 8). Theoretically, the grayscales can be displayed continuously. In the aforementioned embodiment, the circular main substrate 1 is used as an example for illustrating this disclosure, but a square or a hexagonal main substrate 1 may be used instead. In FIG. 12, the square main substrate 1 is treated as a pixel arrangement. In FIG. 13, the hexagonal main substrate 1 is treated as a pixel arrangement. Please refer to the journal "Comparison of square-pixel and hexagonal-pixel resolution in image processing; DOI: 10.1109/CCECE.2002.1013056" for the hexagonal and square pixels. The pixels of FIG. 12 and FIG. 13 are treated as a sub-pixel. According to the sequence of FIG. 11, the pixels are stuck with a red (R), green (G) or blue (B) filter. Now, every three sub-pixels are a pixel. If each square or hexagonal sub-pixel can display 16 grayscales, then 4096 colors can be displayed in the color display mode. To allow the main substrate 1 to rotate, the pixel/sub-pixel density of FIGS. 12 and 13 is lower than that of the pixel of FIG. 10 or the sub-pixel density (referring to resolution) of FIG. 11. If the pixel/sub-pixel arrangement as shown in FIG. 10, 11, 12 or 13 is used, the direction of the second penetration axis 51 of each pixel/sub-pixel second polarizer 5 is the same direction, so that a single second polarizer 5 can be used to cover all pixels/sub-pixels. The description above shows that this disclosure has inventiveness and practicality to a certain degree.

While the invention has been described by means of specific embodiments, numerous modifications and variations could be made thereto by those skilled in the art without departing from the scope and spirit of the invention set forth in the claims.

What is claimed is:

1. A reflective electronic display device, being pixels or sub-pixels, comprising:
   a main substrate;
   an electromagnetic micro-electromechanical module, installed on a side of the main substrate, and having a shaft coupled to the electromagnetic micro-electromechanical module and the main substrate;
   a reflector, stacked onto the other side of the main substrate;
   a first polarizer, stacked on the reflector and configured to be opposite to the main substrate, and the first polarizer further defining a first penetration axis; and
   a second polarizer, installed on a side of the first polarizer and spaced from the first polarizer;
   wherein, the second polarizer further defines a second penetration axis; and the electromagnetic micro-electromechanical module drives the main substrate to drive the reflector, so as to link and rotate the first polarizer, and when the first penetration axis is parallel to the second penetration axis, the light is transmitted by the second polarizer and projected towards the first polarizer, and after the light passes through the first polarizer, the light is reflected by the reflector and then passed through the first polarizer again and projected towards the second polarizer to define a bright mode; and the electromagnetic micro-electromechanical module drives the main substrate to drive the reflector, so as to link and rotate the first polarizer, and when the first penetration axis is perpendicular to the second penetration axis, the light after being transmitted by the second polarizer is unable to reach the reflector, since the light absorbed by the first polarizer is defined as a dark mode; and the electromagnetic micro-electromechanical module drives the main substrate to drive the reflector, so as to link and rotate the first polarizer, and when an included angle is formed between the first penetration axis and the second penetration axis, the included angle is controlled in order to control a grayscale display to define a grayscale mode.

2. The reflective electronic display device as claimed in claim 1, wherein the electromagnetic micro-electromechanical module further comprises a drive transistor and a micro-motor, and the drive transistor drives the micro-motor to perform a clockwise/counterclockwise rotation.

3. The reflective electronic display device as claimed in claim 1, wherein the first polarizer and the second polarizer are linear polarizers.

4. The reflective electronic display device as claimed in claim 1, wherein the first polarizer and the reflector can be substituted by a single piece of wire grid reflective polarizer.

5. The reflective electronic display device as claimed in claim 1, wherein the first polarizer, the reflector and the main substrate have a circular, square or hexagonal shape.

6. The reflective electronic display device as claimed in claim 1, wherein the first polarizer and the second polarizer can absorb a light with a wavelength range covering all visible lights.

7. The reflective electronic display device as claimed in claim 1, wherein the reflector can reflect a light with a wavelength range covering all visible lights.

8. The reflective electronic display device as claimed in claim 1, wherein the second polarizer further comprises a protector plated onto the top thereof, and an anti-reflection film plated onto the top of the protector.

* * * * *